United States Patent
Lopatecki et al.

(10) Patent No.: US 11,663,527 B1
(45) Date of Patent: May 30, 2023

(54) EMBEDDING DRIFT IN A MACHINE LEARNING MODEL

(71) Applicant: ARIZE AI, INC., Mill Valley, CA (US)

(72) Inventors: Jason Lopatecki, Mill Valley, CA (US); Francisco Castillo Carrasco, Mill Valley, CA (US); Aparna Dhinakaran, Dublin, CA (US); Michael Schiff, Mill Valley, CA (US)

(73) Assignee: ARIZE AI, INC., Mill Valley, CA (US)

( * ) Notice: Subject to any disclaimer, the term of this patent is extended or adjusted under 35 U.S.C. 154(b) by 0 days.

(21) Appl. No.: 17/703,205

(22) Filed: Mar. 24, 2022

(51) Int. Cl.
   *G06N 20/00* (2019.01)
   *G06K 9/62* (2022.01)
   *G06F 18/214* (2023.01)

(52) U.S. Cl.
   CPC ........... *G06N 20/00* (2019.01); *G06F 18/214* (2023.01)

(58) Field of Classification Search
   None
   See application file for complete search history.

(56) References Cited

U.S. PATENT DOCUMENTS

| | | |
|---|---|---|
| 11,295,241 B1 | 4/2022 | Badawy et al. |
| 2019/0306011 A1 | 10/2019 | Fenoglio et al. |
| 2021/0074425 A1 | 3/2021 | Carter et al. |
| 2021/0220670 A1 | 7/2021 | Li et al. |

OTHER PUBLICATIONS

Yu H, Liu T, Lu J, Zhang G. Automatic Learning to Detect Concept Drift. arXiv preprint arXiv:2105.01419. May 4, 2021. (Year: 2021).*
Goldenberg I, Webb GI. Survey of distance measures for quantifying concept drift and shift in numeric data. Knowledge and Information Systems. Aug. 2019;60(2):591-615. (Year: 2019).*
Jeatrakul P, Wong KW, Fung CC. Data cleaning for classification using misclassification analysis. Journal of Advanced Computational Intelligence and Intelligent Informatics. 2010;14(3):297-302. (Year: 2010).*

(Continued)

*Primary Examiner* — Vincent Gonzales
(74) *Attorney, Agent, or Firm* — DLA Piper LLP (US)

(57) ABSTRACT

Techniques for determining embedding drift score in a machine learning model. The techniques can include: obtaining one or more first embedding vectors based on at least one first prediction of a machine learning model; filtering the first embedding vectors based on a slice of the first prediction; determining a first average vector by averaging each dimension of the filtered first embedding vectors; obtaining one or more second embedding vectors on at least one second prediction of the machine learning model; filtering the second embedding vectors based on a slice of the second prediction; generating a second average vector by averaging each dimension of the filtered second embedding vectors; and determining an embedding drift score based on a distance measure of the first average vector and the second average vector.

18 Claims, 8 Drawing Sheets

(56) References Cited

OTHER PUBLICATIONS

Greco S, Cerquitelli T. Drift Lens: Real-time unsupervised Concept Drift detection by evaluating per-label embedding distributions. In 2021 International Conference on Data Mining Workshops (ICDMW) Dec. 7, 2021 (pp. 341-349). IEEE. (Year: 2021).*

Castellani A, Schmitts, Hammer B. Task-Sensitive Concept Drift Detector with Constraint Embedding. In 2021 IEEE Symposium Series on Computational Intelligence (SSCI) Dec. 5, 2021 (pp. 01-08). IEEE. (Year: 2021).*

Koychev, Ivan. "Approaches for Learning Classifiers of Drifting Concepts." Nato Security Through Science Series D-Information and Communication Security 15 (2008): 176. (Year: 2008).

Pathak, Kumarjit, and Jitin Kapila. "Reinforcement evolutionary learning method for self-learning." arXiv preprint arXiv:1810.03198 2018). (Year: 2018).

Shanbhag, Aalok, Avijit Ghosh, and Josh Rubin. "Unified shapley framework to explain prediction drift." arXiv preprint arXiv: 2102.07862 (2021). (Year: 2021).

Yuan, Yifei, Zhixiong Wang, and Wei Wang. "Unsupervised concept drift detection based on multi-scale slide windows." Ad Hoc Networks 111 (2021): 102325. (Year: 2021).

Strumbelj, Erik, and Igor Kononenko. "Explaining prediction models and individual predictions with feature contributions." Knowledge and information systems 41.3 (2014): 647-665. (Year: 2014).

Agarwal, Sray, and Shashin Mishra. Responsible AI. Springer International Publishing, 2021. (Year: 2021).

Merrick, Luke, and Ankur Taly. "The explanation game: Explaining machine learning models using shapley values." International Cross-Domain Conference for Machine Learning and Knowledge Extraction. Springer, Cham, 2020. (Year: 2020).

* cited by examiner

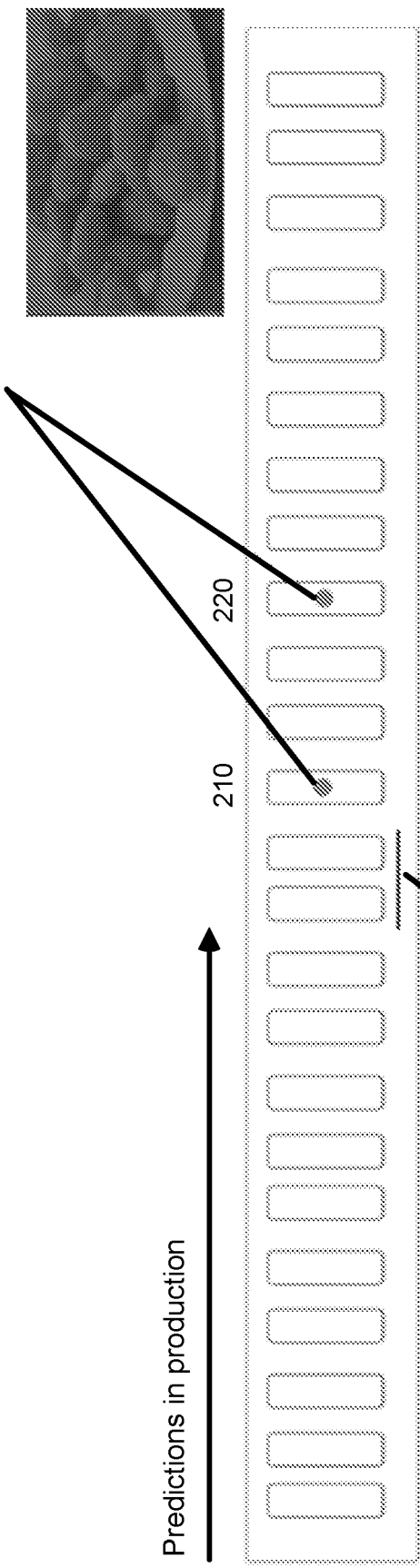
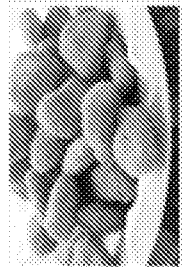
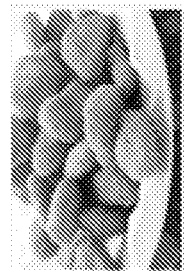
FIG. 2

FIG. 3

EMBEDDING DRIFT IN A MACHINE LEARNING MODEL

RELATED APPLICATIONS

This application is related to U.S. patent application Ser. Nos. 17/212,202 and 17/548,070, which are incorporated in their entirety by reference.

BACKGROUND

Performance of a machine learning model depends on whether the data and labels in the training examples are similar to the production environment. For example, a model's performance may be adversely impacted if it is trained only on images of good quality samples, but in production the model encounters dark/pixelated/blur images or other different situations.

Natural language processing (NLP) training samples (e.g., sentences or paragraphs) may have similar issues because they need to be labeled for training. The labeling can be an expensive and manual task, and typically only done for a tiny fraction of the production data. This is undesirable.

SUMMARY

The present disclosure provides embedding drift techniques to overcome the aforementioned problems by tracking drift of models with unstructured training datasets. For example, a computer-implemented method for determining an embedding drift score in a machine learning model is disclosed. The method can include: obtaining one or more first embedding vectors based on at least one first prediction of a machine learning model; filtering the first embedding vectors based on a slice of the first prediction; determining a first average vector by averaging each dimension of the filtered first embedding vectors; obtaining one or more second embedding vectors based on at least one second prediction of the machine learning model; filtering the second embedding vectors based on a slice of the second prediction; generating a second average vector by averaging each dimension of the filtered second embedding vectors; and determining an embedding drift score based on a distance measure of the first average vector and the second average vector.

In example embodiments, the method can further include optimizing the machine learning model based on the embedding drift score. The determining of the embedding drift score can include determining a Euclidean embedding drift score when the distance measure is a Euclidean distance. The determining of the embedding drift score can include determining a Cosine embedding drift score when the distance measure is a Cosine distance. The machine learning model can be based on unstructured image data or natural language processing. The first prediction can be at a first time period and the second prediction at a second time period. The first prediction can be generated when the model is operating in a training environment and the second prediction can be generated when the model is operating in a production environment. The obtaining of the first embedding vectors and/or the second embedding vectors can include extracting the vectors from the model based on activations at a layer of the model. The filtering of the first embedding vectors and the second embedding vectors comprises removing false negatives and/or false positives from the slice of the first prediction and second prediction, respectively.

A system for determining an embedding drift score in a machine learning model is also disclosed. The system can include a processor and an associated memory, the processor being configured for: obtaining one or more first embedding vectors based on at least one first prediction of a machine learning model; filtering the first embedding vectors based on a slice of the first prediction; determining a first average vector by averaging each dimension of the filtered first embedding vectors; obtaining one or more second embedding vectors based on at least one second prediction of the machine learning model; filtering the second embedding vectors based on a slice of the second prediction; generating a second average vector by averaging each dimension of the filtered second embedding vectors; and determining an embedding drift score based on a distance measure of the first average vector and the second average vector.

BRIEF DESCRIPTION OF DRAWINGS

Other objects and advantages of the present disclosure will become apparent to those skilled in the art upon reading the following detailed description of example embodiments, in conjunction with the accompanying drawings, in which like reference numerals have been used to designate like elements, and in which:

FIG. 2 shows various predictions by a machine learning model according to an example embodiment of the present disclosure;

FIG. 3 illustrates natural language processing (NLP) samples to train a machine learning model according to an example embodiment of the present disclosure;

DESCRIPTION

Figure 1:
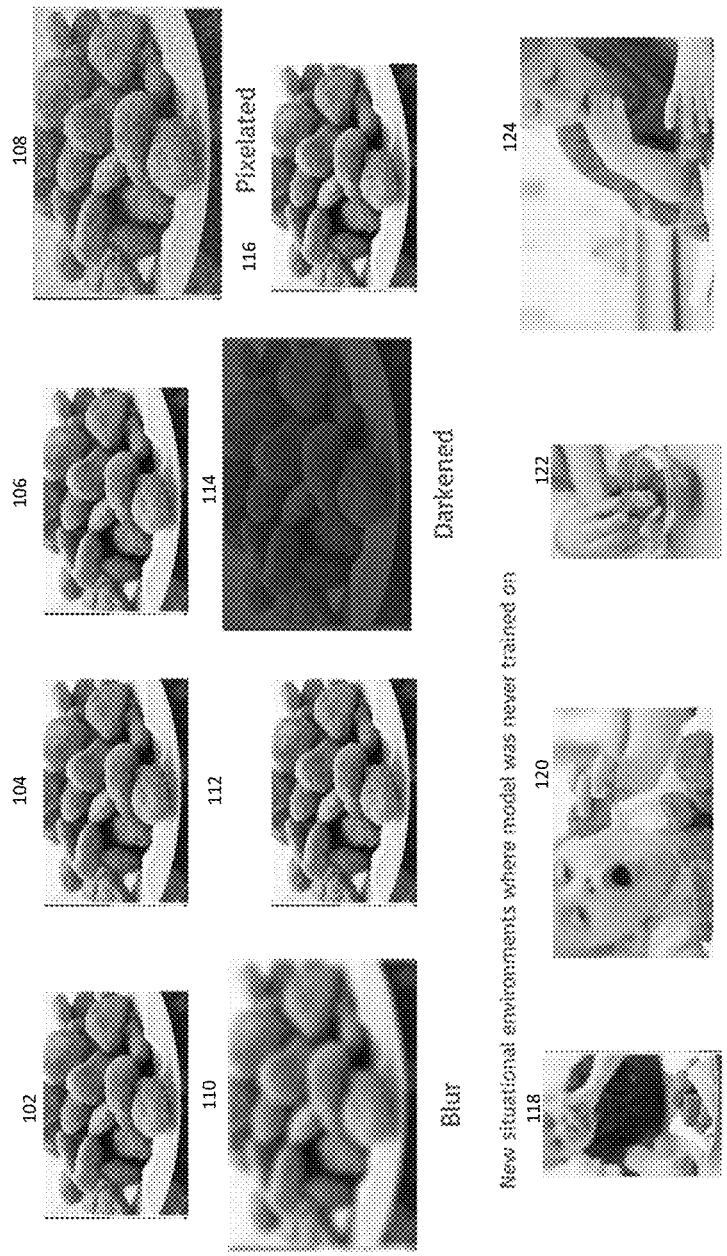
FIG. 1 illustrates images used to train a machine learning model according to an example embodiment of the present disclosure.

The present disclosure provides embedding drift techniques that can track a drift of a machine learning model that is based on unstructured data. FIG. 1 illustrates an example unstructured image dataset (102-124), which are images of chicken nuggets. Images 102, 104, 106, 112, and 116 show high quality images. Image 108 is pixelated, image 110 is blurred, and image 114 is darkened. Images 118-124 show environments where the model was not trained on. A machine learning model trained only on high quality images (102, 104, 106, 112, and 116) may underperform in production if it encounters unstructured image data such as images 108, 110, 114, or 118-124.

FIG. 2 is a graphic showing various predictions by a machine learning model. Of these predictions, predictions 210 and 220 are incorrect predictions. If a model is trained on a sample that excludes predictions 210 and 220 from labeling, then the model may underperform. In the illustrated example, predictions 210 and 220 represent dark images, and so if these are excluded from labeling, the model may underperform when other dark images are input into the model.

FIG. 3 illustrates natural language processing (NLP) examples (302-346) that can be used to train a machine learning model based on movie descriptions and genre labels. The genre can belong to a single category or multiple categories. For example, example 302 has a genre of thriller and example 328 has a genre of thriller as well science fiction and animated. Similar to the previously described machine learning model trained based on images, a machine learning model based on NLP sentences may underperform in production if it encounters inputs that are unstructured NLP sentences or paragraphs. A person of ordinary skill in the art would appreciate that a machine learning model based on unstructured data, as described herein, is not limited to models based on image data or NLP data. It can include models based on other unstructured data, e.g., graphs.

Figure 4:
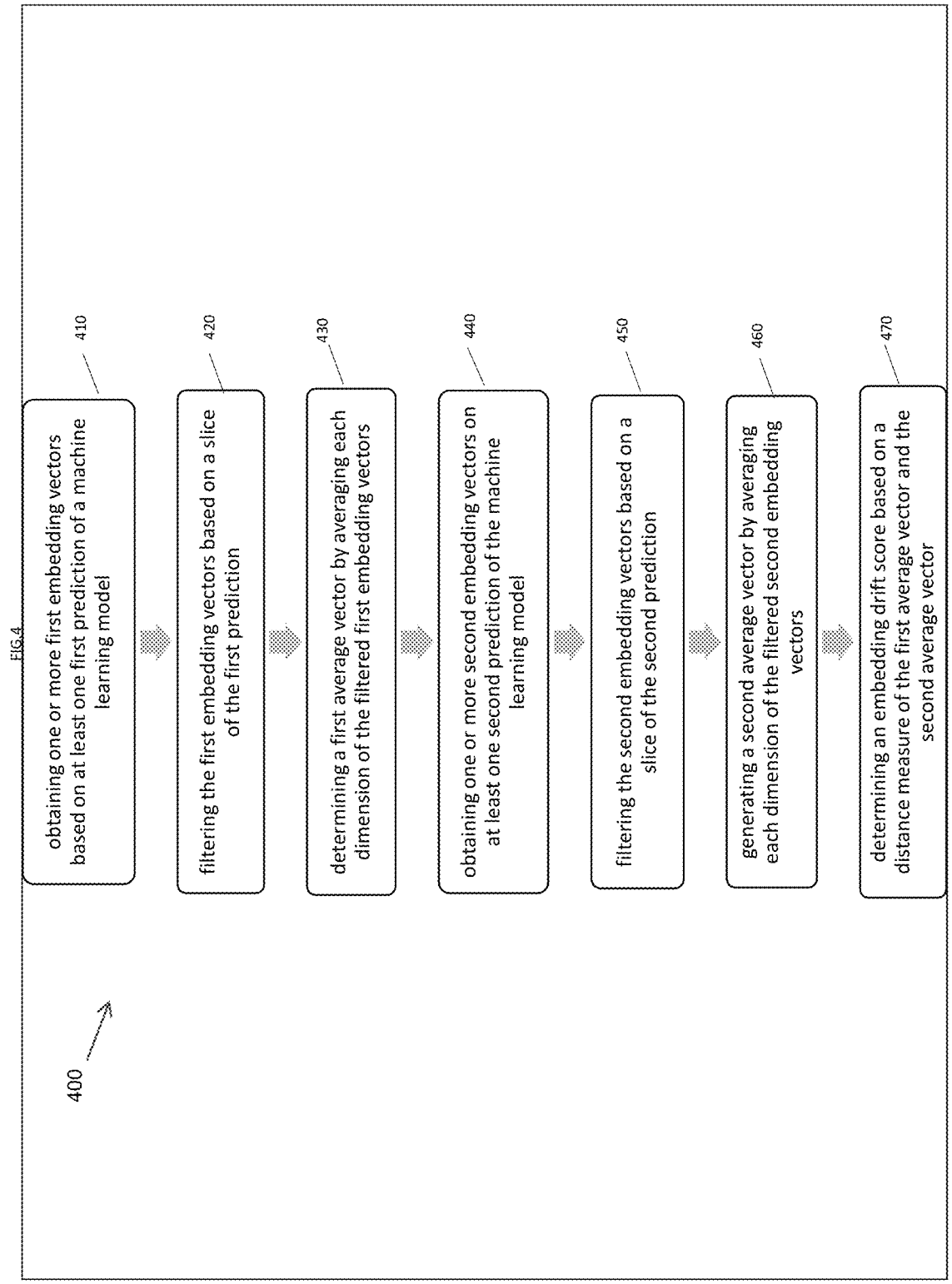
FIG. 4 shows a flowchart of a method for determining the embedding drift metric in a machine learning model according to an example embodiment of the present disclosure.

The present disclosure describes an embedding drift metric that can be used to solve the aforementioned problems with unstructured data in production environments. FIG. 4 shows a flowchart of an example method 400 of determining the embedding drift metric in a machine learning model. The method 400 can include a step 410 of obtaining one or more first embedding vectors based on at least one first prediction of a machine learning model; a step 420 of filtering the first embedding vectors based on a slice of the first prediction; a step 430 of determining a first average vector by averaging each dimension of the filtered first embedding vectors; a step 440 of obtaining one or more second embedding vectors based on at least one second prediction of the machine learning model; a step 450 of filtering the second embedding vectors based on a slice of the second prediction; a step 460 of generating a second average vector by averaging each dimension of the filtered second embedding vectors; and a step 470 of determining an embedding drift score based on a distance measure of the first average vector and the second average vector. Each of these steps are subsequently described in detail.

Although the steps 410-470 are illustrated in sequential order, these steps may also be performed in parallel, and/or in a different order than the order disclosed and described herein. Also, the various steps may be combined into fewer steps, divided into additional steps, and/or removed based upon a desired implementation.

At step 410, one or more first embedding vectors based on at least one first prediction of a machine learning model can be obtained. An embedding vector is a vector of information that can be extracted from a model based on the activations at a specific layer of the model. In example embodiments, the first embedding vectors can be obtained from an external or internal source (e.g., from a memory device, a network connection, etc.), or extracted as explained below.

In an example embodiment, the first embedding vectors can be obtained at a certain timestamp or time period, e.g., when predictions of the model are at a baseline level of accuracy, which can be defined according to the type of model (e.g., an image-based model, NLP based model, etc.). The baseline level of accuracy can be changed/updated during the training or based on the model's performance in production.

In example embodiments, one or more embedding vectors can be grouped by their environment (i.e., vectors from training, validation, or production set) or metadata to form the first set of embedding vectors. Further, one or more embedding vectors can also be grouped based on a combination of their timestamp, environment, and metadata.

Figure 5:
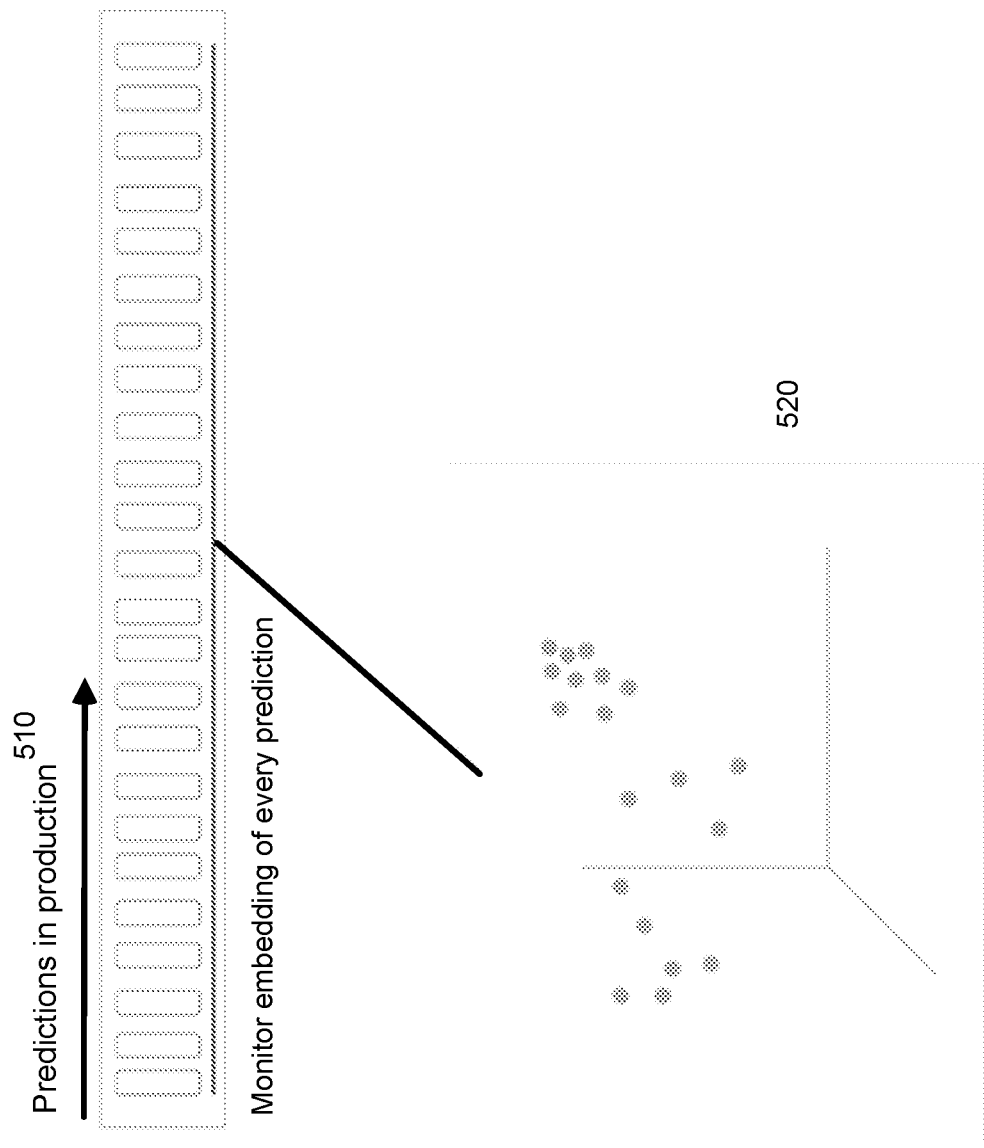
FIG. 5 shows embedding vectors extracted from the model and visualized in a three-dimensional plot according to an example embodiment of the present disclosure.

In an example embodiment, the first embedding vectors of step 410 can be extracted using known methods, e.g., as described in https://beta.openai.com/docs/guides/embeddings (accessed Mar. 16, 2022) or https://www.pinecone.io/learn/vector-embeddings/ (accessed Mar. 16, 2022), which are incorporated by reference. FIG. 5 shows example embedding vectors extracted from predictions 510 of the model and visualized in a three-dimensional plot 520.

At step 420, the first embedding vectors can be filtered by applying filtering criteria (e.g., removing False Positives and/or False negatives) based on a slice (i.e., a subset) of the model's first predictions. Techniques described in application Ser. Nos. 17/212,202 and/or 17/548,070 for generating a slice and filtering can be used to perform step 420.

At step 430, a first average vector can be determined by averaging each dimension of the filtered first embedding vectors. The first average vector can be considered a representation of the filtered first set of embedding vectors. In an example embodiment, the average vector can be calculated by using the below equation. Other known methods may also be used.

$$\vec{v}_{avg} = \frac{1}{N}\sum_{i=1}^{N}\vec{v}_i$$

For a set of embedding vectors that are: $\vec{v}_1=(-1,2,0)$, $\vec{v}_2=(2,3,1)$, $\vec{v}_3=(0,-2,1)$, and $\vec{v}_4=(3,0,-1)$, the average vector using the aforementioned equation can be calculated as:

$$\vec{v}_{avg} = \frac{1}{4}[(-1+2+0+3, 2+3-2+0, 0+1+1-1)] = \frac{1}{4}(4, 3, 1) = (1, 3/4, 1/4).$$

At step 440, one or more second embedding vectors for at least one second prediction of the machine learning model can be obtained. The process for obtained of the second embedding vectors can be similar to the process described for extracting the first embedding vectors in step 410. However, the timestamp/time period, environment, and/or metadata for the second prediction can be different than the first. For example, the second time period (e.g., 1-2 days ago) can be a more recent time than the first time period (e.g, 30 days ago). Similarly, the first prediction can be in a training environment, but the second prediction can be in a production environment.

At step 450, the second embedding vectors can be filtered by applying filtering criteria (e.g., removing False Positives and/or False negatives) based on a slice (i.e., a subset) of the model's second predictions. Techniques described in application Ser. No. 17/212,202 for generating a slice and filtering can be used to perform step 450. In an example embodiment, the criteria used to filter the first embedding vectors and second embedding vectors can be the same.

At step 460, a second average vector can be determined by averaging each dimension of the filtered second embedding vectors. The second average vector can be considered a representation of the filtered second set of embedding vectors. Step 460 can be performed using the process of averaging described with respect to step 430.

For a set of embedding vectors that are: $\vec{w}_1=(5,1/4,0)$, $\vec{w}_2=(1,1,1)$, $\vec{w}_3=(2,-1,1)$, $\vec{w}_4=(3,1/4,-1)$, $\vec{w}_5=(4,3/4,3/2)$, the average vector using the aforementioned equation can be calculated as:

$$\vec{w}_{avg} = \frac{1}{5}\left[\left(5+1+2+3+4, \frac{1}{4}+1-1+\frac{1}{4}+\frac{3}{4}, 0+1+1-1+\frac{3}{2}\right)\right] =$$

$$\frac{1}{5}(15, 5/4, 5/2) = (3, 1/4, 2/4).$$

At step 470, an embedding drift score is determined based on a distance measure of the first average vector and the second average vector. In an example embodiment, the embedding drift score can be determined based on a Euclidean distance measure using the formula:

$$d_{eucl}(\vec{v}, \vec{w}) = \sqrt{\sum_{i=1}^{N}(v_i - w_i)^2}.$$

With the first average vector and the second average vector determined at steps 430 and 460, the Euclidean distance measure is calculated as: $d_{eucl}(\vec{v}, \vec{w}) = \sqrt{(1-3)^2+(3/4-1/4)^2+(1/4-2/4)^2} = \sqrt{4+1/4+1/16} = \sqrt{64/16+4/16+1/16} = \sqrt{69/16} \approx 2.077$.

In another example embodiment, the embedding drift score can be determined based on a Cosine distance measure using the formula:

$$d_{cos}(\vec{v}, \vec{w}) = \frac{\sum_{i=1}^{N} v_i w_i}{\sum_{i=1}^{N} v_i^2 \sum_{i=1}^{N} w_i^2},$$

With the first average vector and the second average vector determined at steps 430 and 460, the Cosine distance measure is calculated as:

$$d_{cos}(\vec{v}, \vec{w}) \frac{1 \cdot 3 + 3/4 \cdot 1/4 + 1/4 \cdot 2/4}{\sqrt{1^2+(3/4)^2+(1/4)^2} \cdot \sqrt{3^2+(1/4)^2+(2/4)^2}} =$$

$$\frac{3+3/16+2/16}{\sqrt{1+9/16+1/16} \cdot \sqrt{9+1/16+4/16}} =$$

$$\frac{53/16}{\sqrt{26/16} \cdot \sqrt{149/16}} = \frac{53}{\sqrt{26 \cdot 149}} = \frac{53}{\sqrt{3874}} \approx 0.851.$$

Figure 6B:
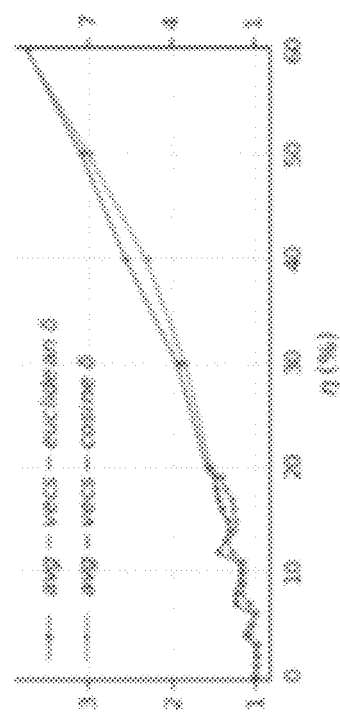
FIGS. 6A-6D show representations of embedding drift score based on the Euclidean and Cosine distance measures according to example embodiments of the present disclosure.
Figure 6D:
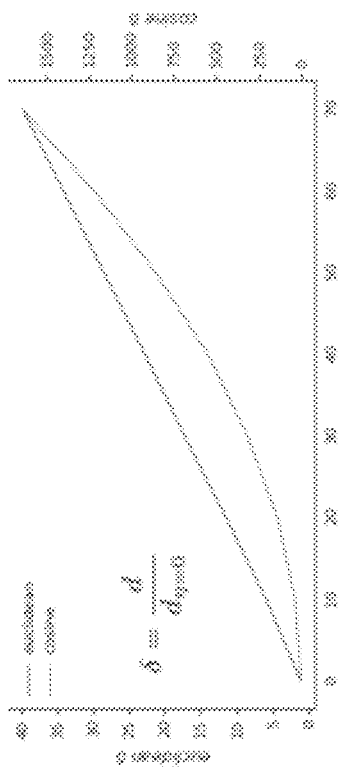
Figure 6A:
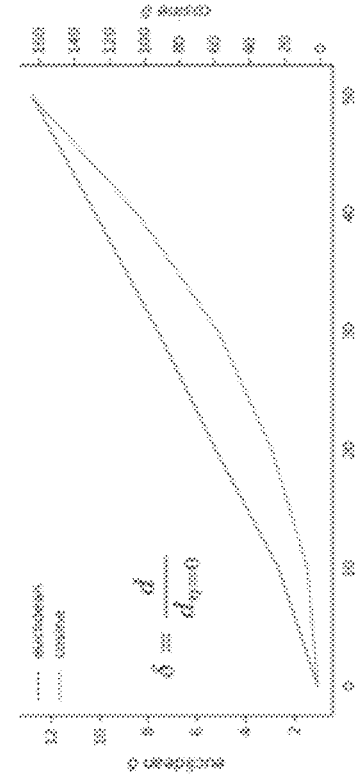
Figure 6C:
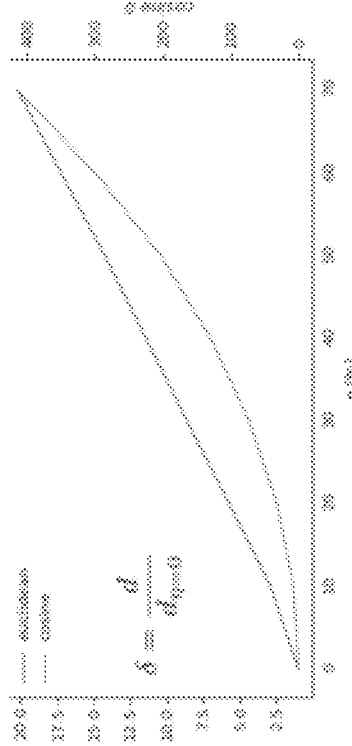

FIG. 6A-6D shows various example representations of embedding drift scores based on the Euclidean and Cosine distance measures in accordance with the disclosed principles in steps 410-470. FIG. 6A shows a representation for an image dataset of chicken nuggets shown in FIG. 1. FIG. 6B shows a representation for an NLP dataset of movie genres and descriptions shown in FIG. 2. FIG. 6C shows a representation for an NLP dataset of women's clothing reviews. FIG. 6D shows a representation for an NLP dataset of hotel reviews.

The magnitude of change in the distance measure over time provides an indication of the magnitude of the embedding drift. In some cases, a relationship between the distance measure and the embedding drift can be directly proportional, i.e., any increase/decrease in the distance measure has a corresponding and exact increase/decrease in the embedding drift score. However, if the relationship is not directly proportional, the distance measure may suggest a different embedding drift across datasets, customers, environments, etc.

Therefore, being able to compare the values of the distance between a reference group and any other group of embeddings may require adding scale information to the progression information to be extracted from the tracking of the distances over time. In an example embodiment, this can be done by scaling the distances over time calculated before with a reference distance. The reference Euclidean distance and reference Cosine distance between embeddings from the same dataset but at different time periods, environment, feature metadata, etc. can be calculated by using the following formulae respectively:

$$d'_{eucl}(\vec{v}, \vec{w}) = \frac{d_{eucl;t=t_1}(\vec{v}, \vec{w})}{d_{eucl;t=t_2}(\vec{v}, \vec{w})}; d'_{cos}(\vec{v}, \vec{w}) = \frac{d_{cos;t=t_1}(\vec{v}, \vec{w})}{d_{cos;t=t_2}(\vec{v}, \vec{w})}$$

The reference Euclidean distance and reference Cosine distance between embeddings from different datasets can be calculated by using the following formulae respectively:

$$d'_{eucl}(\vec{v}, \vec{w}, \vec{u}) = \frac{d_{eucl}(\vec{v}, \vec{w})}{d_{eucl}(\vec{u}, \vec{w})} = \frac{\sqrt{\sum_{i=1}^{N}(v_i-w_i)^2}}{\sqrt{\sum_{i=1}^{N}(u_i-w_i)^2}} = \sqrt{\frac{\sum_{i=1}^{N}(v_i-w_i)^2}{\sum_{i=1}^{N}(u_i-w_i)^2}}; \text{ and}$$

$$d'_{cos}(\vec{v}, \vec{w}, \vec{u}) = \frac{d_{cos}(\vec{v}, \vec{w})}{d_{cos}(\vec{u}, \vec{w})} = \frac{\frac{\sum_{i=1}^{N} v_i w_i}{\sqrt{\sum_{i=1}^{N} v_i^2}\sqrt{\sum_{i=1}^{N} w_i^2}}}{\frac{\sum_{i=1}^{N} u_i w_i}{\sqrt{\sum_{i=1}^{N} u_i^2}\sqrt{\sum_{i=1}^{N} w_i^2}}} = \frac{\sum_{i=1}^{N} v_i w_i \sqrt{\sum_{i=1}^{N} u_i^2}}{\sum_{i=1}^{N} u_i w_i \sqrt{\sum_{i=1}^{N} v_i^2}},$$

where the vector $\vec{u}$ depends on a type of scaling to be performed.

For time scaling, the vector representing dataset A evolves with time. The vector that represents dataset B, is deemed constant (hence used as reference). In this scenario, vectors $\vec{v}, \vec{w}$ represent dataset A and B, respectively, at $t=t_1$. Vector $\vec{u}$ represents dataset A at $t=t_2$. As mentioned, dataset B is recommended to be approximately constant in time.

For environment scaling, the vector representing dataset A evolves with time. The vector that represents dataset B, is deemed constant (hence used as reference). In this scenario, vectors $\vec{v}, \vec{w}$ represent dataset A and B, respectively, at $t=t_1$. Vector $\vec{u}$ represents dataset A at $t=t_2$. As mentioned, dataset B is recommended to be approximately constant in time.

In an example embodiment, A is a group of 4 vectors, each with 3 dimensions. As calculated previously, the average vector representing group A at time t1 is $\vec{v}=(1,3/4,1/4)$. B is a group of 5 vectors, each with 3 dimensions. As calculated previously, the average vector representing group B at time t1 is $\vec{w}=(3,1/4,2/4)$.

At time t2, the datasets A and B can be represented by the vectors $\vec{u}=(1, 1/4, 6/4)$, and $\vec{w}=(3, 1/4, 2/4)$, respectively. In this example embodiment, the vector representing dataset B remains the same to have a constant sense of scale. The distance between dataset A at time t2 and the dataset B at time t1 can be compared. The scaled distances are calculated as follows.

Euclidean $$d'_{eucl}(\vec{v}, \vec{w}, \vec{u}) = \sqrt{\frac{\sum_{i=1}^{N}(v_i - w_i)^2}{\sum_{i=1}^{N}(u_i - w_i)^2}} = \sqrt{\frac{(1-3)^2 + (3/4 - 1/4)^2 + (1/4 - 2/4)^2}{(1-3)^2 + (1/4 - 1/4)^2 + (6/4 - 2/4)^2}} =$$

$$\sqrt{\frac{4 + 4/16 + 1/16}{4 + 0 + 1}} = \sqrt{\frac{69/16}{5}} = \sqrt{\frac{69}{80}} \approx 0.929$$

Cosine $$d'_{cos}(\vec{v}, \vec{w}, \vec{u}) = \frac{\sum_{i=1}^{N} v_i w_i \sqrt{\sum_{i=1}^{N} u_i^2}}{\sum_{i=1}^{N} u_i w_i \sqrt{\sum_{i=1}^{N} v_i^2}} =$$

$$\frac{[1 \cdot 3 + 3/4 \cdot 1/4 + 1/4 \cdot 2/4] \cdot \sqrt{1^2 + (1/4)^2 + (6/4)^2}}{[1 \cdot 3 + 1/4 \cdot 1/4 + 6/4 \cdot 2/4] \cdot \sqrt{1^2 + (3/4)^2 + (1/4)^2}} =$$

$$\frac{[3 + 3/16 + 2/16] \cdot \sqrt{1 + 1/16 + 36/16}}{[3 + 1/16 + 12/16] \cdot \sqrt{1 + 9/16 + 1/16}} =$$

$$\frac{\frac{53}{16}\sqrt{\frac{53}{16}}}{\frac{61}{16}\sqrt{\frac{26}{16}}} = \frac{53\sqrt{53}}{61\sqrt{26}} \approx 1.241$$

In this example, the dataset A (e.g., in a production environment), is represented by vector $\vec{v}=(1,3/4,1/4)$, dataset B (e.g., training environment) is represented by $\vec{w}=(3, 1/4, 2/4)$, and dataset C (e.g., validation environment) is represented by vector $\vec{u}=(1, 1/4, 6/4)$. Since the vectors are the same the scaled distances results are the same as above. A person of skill in the art would understand that while the calculations are the same in this example, in other examples the calculations may vary if reference datasets and scaling methods are changed, hence the scaled distance may change as well.

Issues arising from embedding drift can range from sudden data pipeline failures to long-term drift in feature inputs. The following are non-limiting examples of such issues: (1) incorrect data indexing mistake—breaks upstream mapping of data; (2) software engineering changes the meaning of a field; (3) third party data source makes a change dropping a feature, changing format, or moving data; (4) newly deployed code changes an item in a feature vector; (5) outside world drastically changes (e.g., the covid-19 pandemic) and every feature shifts; (6) periodic daily collection of data fails, causing missing values or lack of file; (7) presumption of valid format that changes and is suddenly not valid; (8) third party library functionality changes; (9) date string changes format; (10) bad text handling—causes new tokens model has never seen, for e.g., mistakes handling case and problems with new text string; (11) system naturally evolves and feature shifts; (12) drastic increase in volume skews statistics; and (13) different sources of features with different coordinates or indexing.

In the real-world post model-deployment, the embedding drift issues can occur in a myriad of different ways and cause model performance issues. Therefore, to avoid such issues, the embedding drift can be monitored proactively, and an alert can be raised if the embedding drift score exceeds a predefined threshold.

Figure 7:
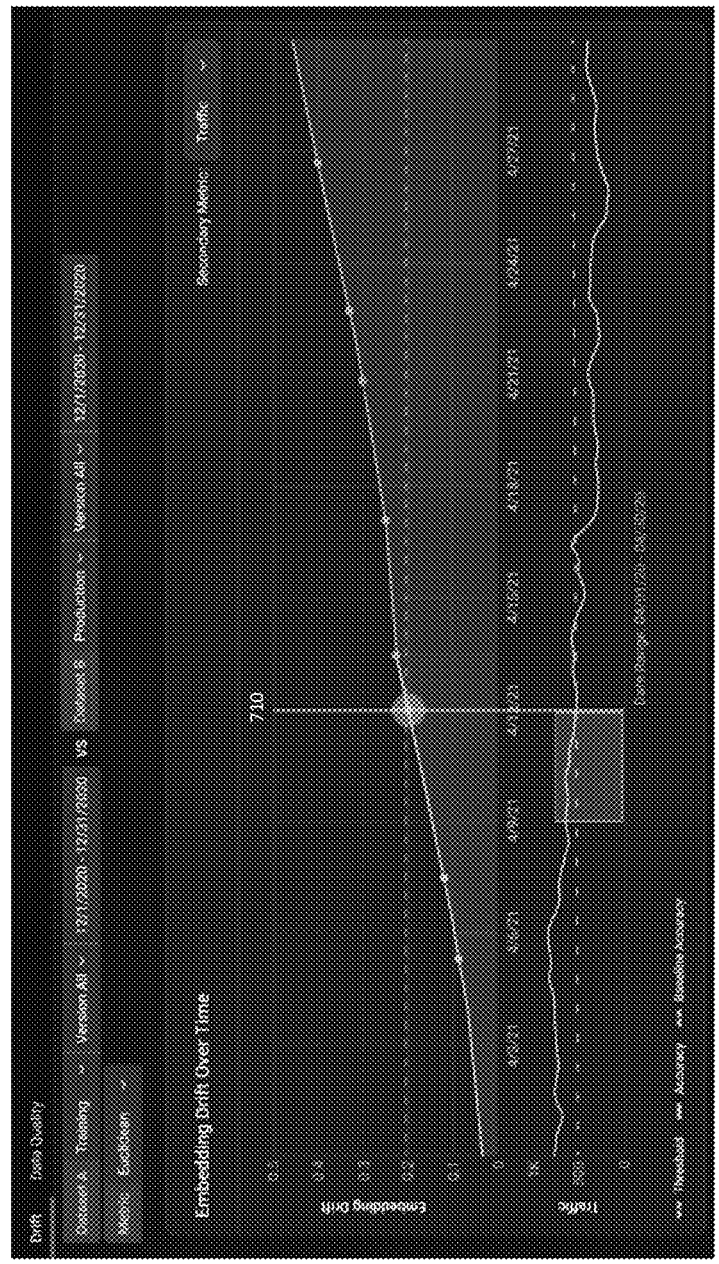
FIG. 7 shows a graph for embedding drift over time according to example embodiment of the present disclosure.

FIG. 7 shows a graph for embedding drift over time. In an example embodiment, if the embedding drift exceeds 0.2 (shown by the vertical line 710), an alert can be raised. The machine learning model can then be optimized by adjusting/changing one or more predictions or slices of predictions of the machine learning model. Techniques described in application Ser. No. 17/212,202for optimizing the model can be used.

Figure 8:
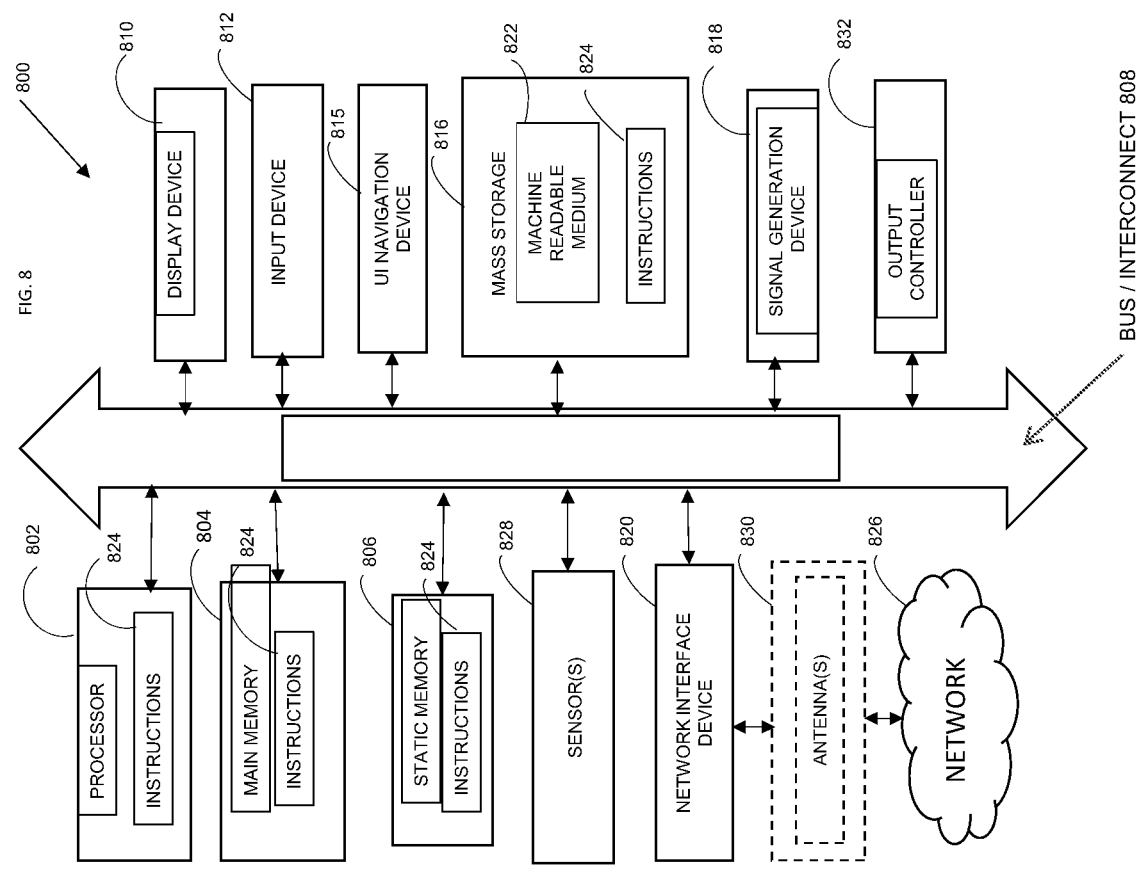
FIG. 8 illustrates a machine configured to perform computing operations according to an example embodiment of the present disclosure.

FIG. 8 shows an example system 800 that can be used for implementing the method 400 and other aspects of the present disclosure. The system 800 can include a processor 802 (e.g., a central processing unit (CPU), a graphics processing unit (GPU) or both) and an associated memory 804. The processor 802 can be configured to perform all the previously described steps with respect to method 400. In various embodiments, the computer system 800 can operate as a standalone device or may be connected (e.g., networked) to other machines. In a networked deployment, the machine may operate in the capacity of either a server or a client machine in server-client network environments, or it may act as a peer machine in peer-to-peer (or distributed) network environments.

Example computer system 800 may further include a static memory 806, which communicate via an interconnect 808 (e.g., a link, a bus, etc.). The computer system 800 may further include a video display unit 810, an input device 812 (e.g., keyboard) and a user interface (UI) navigation device 814 (e.g., a mouse). In one embodiment, the video display unit 810, input device 812 and UI navigation device 814 are a touch screen display. The computer system 800 may additionally include a storage device 816 (e.g., a drive unit), a signal generation device 818 (e.g., a speaker), an output controller 832, and a network interface device 820 (which may include or operably communicate with one or more antennas 830, transceivers, or other wireless communications hardware), and one or more sensors 828.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 constituting machine-readable media.

While the machine-readable medium 822 is illustrated in an example embodiment to be a single medium, the term "machine-readable medium" may include a single medium or multiple medium (e.g., a centralized or distributed database, and/or associated caches and servers) that store the one or more instructions 824.

The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions.

The term "machine-readable medium" shall accordingly be taken to include, but not be limited to, solid-state memories, optical media, and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of several well-known transfer protocols (e.g., HTTP). Examples of communication networks include a local area network (LAN), wide area network (WAN), the Internet, mobile telephone networks, Plain Old Telephone (POTS) networks, and wireless data networks (e.g., Wi-Fi, 3G, and 4G LTE/LTE-A or WiMAX networks).

The term "transmission medium" shall be taken to include any intangible medium that can store, encoding, or carrying instructions for execution by the machine, and includes digital or analog communications signals or other intangible medium to facilitate communication of such software.

Other applicable network configurations may be included within the scope of the presently described communication networks. Although examples were provided with reference to a local area wireless network configuration and a wide area Internet network connection, it will be understood that communications may also be facilitated using any number of personal area networks, LANs, and WANs, using any combination of wired or wireless transmission mediums.

The embodiments described above may be implemented in one or a combination of hardware, firmware, and software. For example, the features in the system architecture 800 of the processing system may be client-operated software or be embodied on a server running an operating system with software running thereon.

While some embodiments described herein illustrate only a single machine or device, the terms "system", "machine", or "device" shall also be taken to include any collection of machines or devices that individually or jointly execute a set (or multiple sets) of instructions to perform any one or more of the methodologies discussed herein.

Examples, as described herein, may include, or may operate on, logic or several components, modules, features, or mechanisms. Such items are tangible entities (e.g., hardware) capable of performing specified operations and may be configured or arranged in a certain manner. In an example, circuits may be arranged (e.g., internally or with respect to external entities such as other circuits) in a specified manner as a module, component, or feature. In an example, the whole or part of one or more computer systems (e.g., a standalone, client or server computer system) or one or more hardware processors may be configured by firmware or software (e.g., instructions, an application portion, or an application) as an item that operates to perform specified operations. In an example, the software may reside on a machine readable medium. In an example, the software, when executed by underlying hardware, causes the hardware to perform the specified operations.

Accordingly, such modules, components, and features are understood to encompass a tangible entity, be that an entity that is physically constructed, specifically configured (e.g., hardwired), or temporarily (e.g., transitorily) configured (e.g., programmed) to operate in a specified manner or to perform part or all operations described herein. Considering examples in which modules, components, and features are temporarily configured, each of the items need not be instantiated at any one moment in time. For example, where the modules, components, and features comprise a general-purpose hardware processor configured using software, the general-purpose hardware processor may be configured as respective different items at different times. Software may accordingly configure a hardware processor, for example, to constitute a particular item at one instance of time and to constitute a different item at a different instance of time.

Additional examples of the presently described method, system, and device embodiments are suggested according to the structures and techniques described herein. Other non-limiting examples may be configured to operate separately or can be combined in any permutation or combination with any one or more of the other examples provided above or throughout the present disclosure.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

It should be noted that the terms "including" and "comprising" should be interpreted as meaning "including, but not limited to". If not already set forth explicitly in the claims, the term "a" should be interpreted as "at least one" and "the", "said", etc. should be interpreted as "the at least one", "said at least one", etc. Furthermore, it is the Applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A computer-implemented method for determining an embedding drift score in a machine learning model, the method comprising:
   obtaining one or more first embedding vectors based on at least one first prediction of a machine learning model;
   filtering the first embedding vectors based on a slice of the first prediction;
   determining a first average vector by averaging each dimension of the filtered first embedding vectors;
   obtaining one or more second embedding vectors based on at least one second prediction of the machine learning model;

filtering the second embedding vectors based on a slice of the second prediction;

generating a second average vector by averaging each dimension of the filtered second embedding vectors;

determining an embedding drift score based on a distance measure of the first average vector and the second average vector; and optimizing the machine learning model based on the embedding drift score.

2. The method of claim 1, wherein determining the embedding drift score comprises: determining a Euclidean embedding drift score when the distance measure is a Euclidean distance.

3. The method of claim 1, wherein determining the embedding drift score comprises: determining a Cosine embedding drift score when the distance measure is a Cosine distance.

4. The method of claim 1, wherein the machine learning model is based on unstructured image data.

5. The method of claim 1, wherein the machine learning model is based on unstructured natural language data.

6. The method of claim 1, wherein the first prediction is during a first time period and the second prediction is during a second time period.

7. The method of claim 1, wherein the first prediction is generated when the model is operating in a training environment and the second prediction is generated when the model is operating in a production environment.

8. The method of claim 1, wherein obtaining the first embedding vectors and/or the second embedding vectors comprises extracting the vectors from the model based on activations at a layer of the model.

9. The method of claim 1, wherein the filtering of the first embedding vectors and the second embedding vectors comprises removing false negatives and/or false positives from the slice of the first prediction and second prediction respectively.

10. A system for determining an embedding drift score in a machine learning model, the system comprising:

a processor and an associated memory, the processor being configured for:

obtaining one or more first embedding vectors based on at least one first prediction of a machine learning model;

filtering the first embedding vectors based on a slice of the first prediction;

determining a first average vector by averaging each dimension of the filtered first embedding vectors;

obtaining one or more second embedding vectors based on at least one second prediction of the machine learning model;

filtering the second embedding vectors based on a slice of the second prediction;

generating a second average vector by averaging each dimension of the filtered second embedding vectors;

determining an embedding drift score based on a distance measure of the first average vector and the second average vector; and optimizing the machine learning model based on the embedding drift score.

11. The system of claim 10, wherein determining the embedding drift score comprises: determining an euclidean embedding drift score when the distance measure is an euclidean distance.

12. The system of claim 10, wherein determining the embedding drift score comprises: determining a Cosine embedding drift score when the distance measure is a Cosine distance.

13. The system of claim 10, wherein the machine learning model is based on unstructured image data.

14. The system of claim 10, wherein the machine learning model is based on unstructured natural language data.

15. The system of claim 10, wherein the first prediction is during a first time period and the second prediction is during a second time period.

16. The system of claim 10, wherein the first prediction is generated when the model is operating in a training environment and the second prediction is generated when the model is operating in a production environment.

17. The system of claim 10, wherein obtaining the first embedding vectors and/or the second embedding vectors comprises extracting the vectors from the model based on activations at a layer of the model.

18. The system of claim 10, wherein the filtering of the first embedding vectors and the second embedding vectors comprises removing false negatives and/or false positives from the slice of the first prediction and second prediction respectively.

* * * * *